(12) United States Patent  
Nikkel

(10) Patent No.: US 8,893,461 B2  
(45) Date of Patent: Nov. 25, 2014

(54) KNIFE AND COUNTER KNIFE IN MACHINE DISK

(75) Inventor: Walter Nikkel, Curitiba (BR)

(73) Assignee: Blount, Inc., Portland, OR (US)

( * ) Notice: Subject to any disclaimer, the term of this patent is extended or adjusted under 35 U.S.C. 154(b) by 116 days.

(21) Appl. No.: 13/377,354

(22) PCT Filed: Jun. 1, 2010

(86) PCT No.: PCT/BR2010/000184  
§ 371 (c)(1),  
(2), (4) Date: Feb. 22, 2012

(87) PCT Pub. No.: WO2010/142009  
PCT Pub. Date: Dec. 16, 2010

(65) Prior Publication Data  
US 2012/0137648 A1 Jun. 7, 2012

(30) Foreign Application Priority Data  
Jun. 9, 2009 (BR) .................................. 8901415 U

(51) Int. Cl.  
*A01D 34/52* (2006.01)  
*A01D 34/73* (2006.01)  
*A01D 45/10* (2006.01)

(52) U.S. Cl.  
CPC .............. *A01D 34/733* (2013.01); *A01D 45/10* (2013.01)  
USPC ............................................... 56/295; 56/255

(58) Field of Classification Search  
USPC ................................. 56/6, 13.6, 157, 295, 255  
See application file for complete search history.

(56) References Cited

U.S. PATENT DOCUMENTS

| 582,966 | A | 5/1897 | Twiss |
|---|---|---|---|
| D31,716 | S | 10/1899 | Bolton |
| D32,191 | S | 2/1900 | Fuller |
| D85,612 | S | 11/1931 | Gaynor |
| D174,375 | S | 4/1955 | Cole |
| 2,795,916 | A * | 6/1957 | Miller ........................ 56/17.1 |

(Continued)

FOREIGN PATENT DOCUMENTS

| AU | 2003204322 A1 | 1/2004 |
|---|---|---|
| EP | 22588 A1 * | 1/1981 |
| GB | 1141833 A | 2/1969 |

OTHER PUBLICATIONS

Langton, M.I., "Methods and Techniques of Sugarcane Harvesting," School of Bioresources Engineering and Environmental Hydrology, University of KwaZulu-Natal, Pietermaritzburg, South Africa, Apr. 2004.

*Primary Examiner* — Alicia Torres  
(74) *Attorney, Agent, or Firm* — Schwabe Williamson & Wyatt

(57) ABSTRACT

A rectangular counter knife with a larger diameter hole, the counter knife has two lateral, longitudinal, parallel, rectangular and vertical walls inferiorly forming a rectangular recess, the two rectangular, inferior and transversal guides of the rotating disk, support the rectangular knife, adjusting a hex-nut in a larger diameter hole, coincident to the hole, receiving these holes on inferior-superior direction, a hex-head screw initially by-pass one of the two holes centralized along one rectangular knife with two side cutting edges and their ends have, a constructive variant comprising a rectangular knife with a longitudinal, central and oblong opening, with two central, opposite and semi-circular projections forming a circular central opening in the middle of the knife; the rectangular knife has two side cutting edges and two cutting edges on the ends.

12 Claims, 4 Drawing Sheets

(56) References Cited

U.S. PATENT DOCUMENTS

| | | | |
|---|---|---|---|
| 2,983,057 A | 5/1961 | Erickson | |
| 3,103,093 A * | 9/1963 | House, Jr. | 56/295 |
| D201,710 S | 7/1965 | Monek | |
| 3,395,521 A * | 8/1968 | Crockett et al. | 56/295 |
| 3,395,522 A * | 8/1968 | Zweegers | 56/295 |
| 3,662,530 A * | 5/1972 | Henriksen | 56/295 |
| D248,474 S | 7/1978 | Oosterling | |
| 4,109,380 A | 8/1978 | Anderson | |
| D268,641 S | 4/1983 | Bonforte | |
| D274,815 S | 7/1984 | Ehrler | |
| D280,903 S | 10/1985 | Barbula | |
| 4,815,264 A | 3/1989 | Mijnders | |
| 5,438,819 A * | 8/1995 | Dallman | 56/295 |
| D370,489 S | 6/1996 | Taggett | |
| D386,655 S | 11/1997 | Spirer | |
| D396,174 S | 7/1998 | Schultz | |
| D410,309 S | 5/1999 | Schmidt | |
| D412,230 S | 7/1999 | Schmidt | |
| D448,779 S | 10/2001 | Neuerburg | |
| D449,053 S | 10/2001 | Neuerburg | |
| D449,314 S | 10/2001 | Neuerburg | |
| D449,623 S | 10/2001 | Neuerburg | |
| D450,065 S | 11/2001 | Neuerburg | |
| D475,575 S | 6/2003 | Mendenhall | |
| D562,357 S | 2/2008 | Hardy | |
| D566,513 S | 4/2008 | Marfione | |
| D637,876 S | 5/2011 | Williams | |
| D640,289 S | 6/2011 | Wilhelm | |
| D645,479 S | 9/2011 | Ehrhart | |
| 2004/0177484 A1 * | 9/2004 | Thompson et al. | 29/402.03 |
| 2010/0043378 A1 * | 2/2010 | Abernethy | 56/295 |

\* cited by examiner

KNIFE AND COUNTER KNIFE IN MACHINE DISK

CROSS REFERENCE TO RELATED APPLICATIONS

The present application claims priority to PCT Application No. PCT/BR2010/000184, filed Jun. 1, 2010, entitled "Knife and Counter Knife in Machine Disk," which claims priority to Brazilian Utility Model Application No. MU 8901415-4 filed Jun. 9, 2009, the entire disclosures of which are hereby incorporated by reference in their entirety.

TECHNICAL FIELD

The present patent refers to a utility model of a rotating cutting disc, a counter knife, and a knife of a sugar cane harvesting machine. The counter knife and knife allow the increase of speed in the cut of sugar cane and economy in manufacturing of the cutting components.

BACKGROUND

As is known among sugar cane producers, sugar cane harvesting machines are currently equipped with rotating discs that have coupled to their circumference steel knives which are responsible for cutting the sugar cane. However, due to the intense cutting activity executed closely to the ground, conventional blades manufactured with hardened steel quickly experience considerable wear on the cutting edges. This wear forces the machine operator to make constant replacements of the blades. Replacement of the knives results in undesirable machine shutdown because each knife is fixed on the rotating disc by two bolts. The operator has to lay below the rotating disc in order to take off the two bolts and the knife with a wrench. This replacement process usually happens in unfavorable locations, i.e., in the cane field, with poor lighting because of the position of the operator. Next, the operator has to fix the new knife on the disc with the respective bolts, and repeat the same replacement operation on the other knives with dull cutting edges. It should be emphasized that during these knife replacements, the bolts used to secure the knives to the rotating disc are often lost in the vegetation. Because of these inconveniences, the blade replacements cause machine shutdowns and end up reducing the productivity of sugar cane cutting operation.

Another concern is that the existing steel knives have considerable size, weighing approximately 1 kg, and are typically constructed in a single-piece design. This single-piece design is a non-economical feature because short term replacements are inevitable due to wear of the cutting edges. These replacements result in an increased cost of the sugar cane cutting operation.

SUMMARY OF THE INVENTION

The configuration applied in the set of a knife and a counter knife connected to the disk of a sugar cane harvesting machine was developed and designed to remedy the disadvantages mentioned in the discussion of the background art. The proposed configuration encompasses a first and second embodiment. The first embodiment is comprised of a counter knife that is permanently coupled by bolts on the circumference of the rotating disc, with a respective knife coupled to the counter knife through one single bolt. The counter knife forms a cradle for safe attachment of the knife. The position of the knife is adjusted by manipulation of one single bolt, i.e., by fixing the bolt in one of the two holes longitudinally centered on the knife. The feature of the single bolt allows the use of all four cutting edges on the two sides and two ends of the knife. The second embodiment is similar to the first embodiment, with the primary difference being that, in the second embodiment, the knife is coupled to the counter knife without the need to remove the fastener component. Rather, the bolt is only loosened for the replacement of the knife with worn cutting edges. The replacement operation is extremely simplified by the fact that the knife has a longitudinal, central and oblong opening with two central and opposite projections, each one being semicircular, and forming a central circular opening in the middle of the knife. This central circular opening allows the fixing or removal of the knife to the counter knife because the mentioned central circular opening forms a diameter bigger than the bolt head. So, during the assembly, the knife is positioned under the counter knife, and the adjustment to fix the two parts is made by tightening the bolt on one end of the longitudinal and oblong opening. The use of the oblong opening on the knife makes the cutting adjustment possible, thereby enabling the use of the two sides and two ends of the existing cutting edges.

The proposed design disposition i.e., the set of the knife and the counter knife provides significant downtime reduction of the sugar cane cutting machine, because the set enables the fast replacement of the knife set, as described above. The fast replacement has economic benefits because less steel is used in manufacturing the knives, and the knives exhibit better cutting performance. It is important to note that the counter knife provides a support for the knife, and the special design of the knife allows for the knife to have smaller dimensions than conventional blades, both in width and in length. These smaller dimensions make the knife 50% lighter in weight than a conventional knife, and the production cost of the knife is lower because less raw materials are necessary to construct the knife. The smaller size of the knife in width and length also provides a power reduction of the harvester machine, due to the knife creating less friction when cutting the cane. Note that the rotating disc has specific holes for the attachment of the counter knives and knives.

BRIEF DESCRIPTION OF THE DRAWINGS

The embodiments of the present application may be better understood through the attached drawings and respective comments, which include.

DETAILED DESCRIPTION OF DISCLOSED EMBODIMENTS

Figure 1:
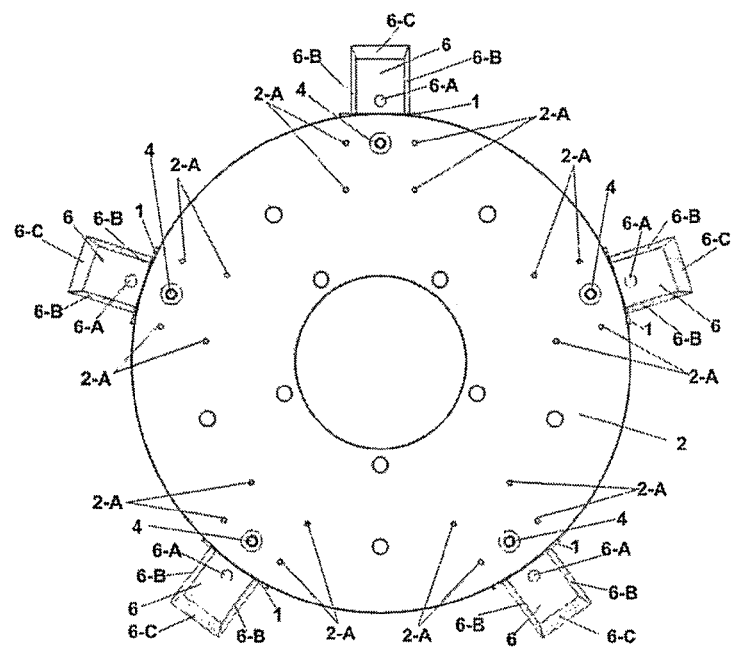
FIG. 1 shows the upper view of the first embodiment, showing the disc with the knife and counter knife.
Figure 2:
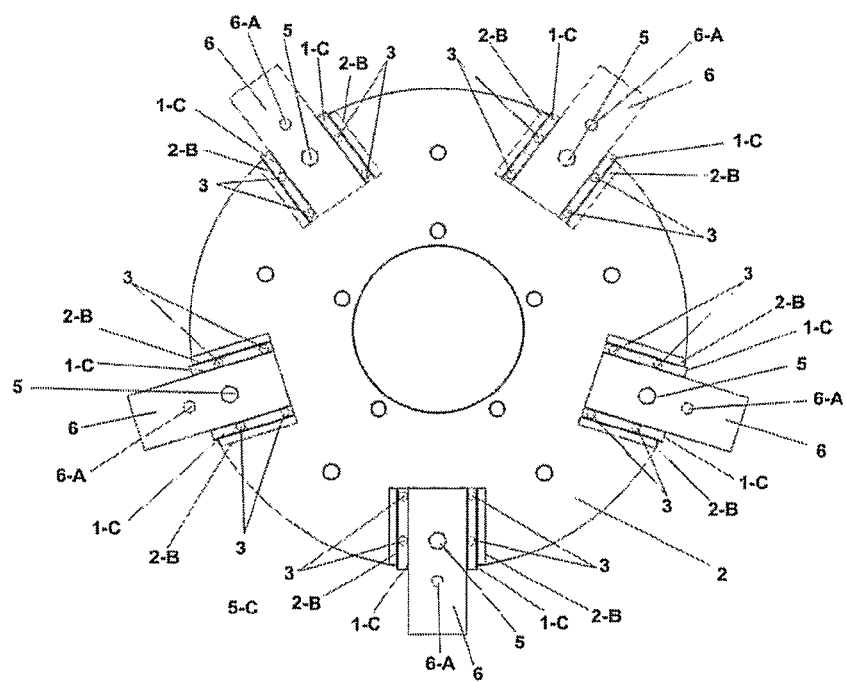
FIG. 2 shows the lower view of the first embodiment, showing the disc with the knife and counter knife.
Figure 3:
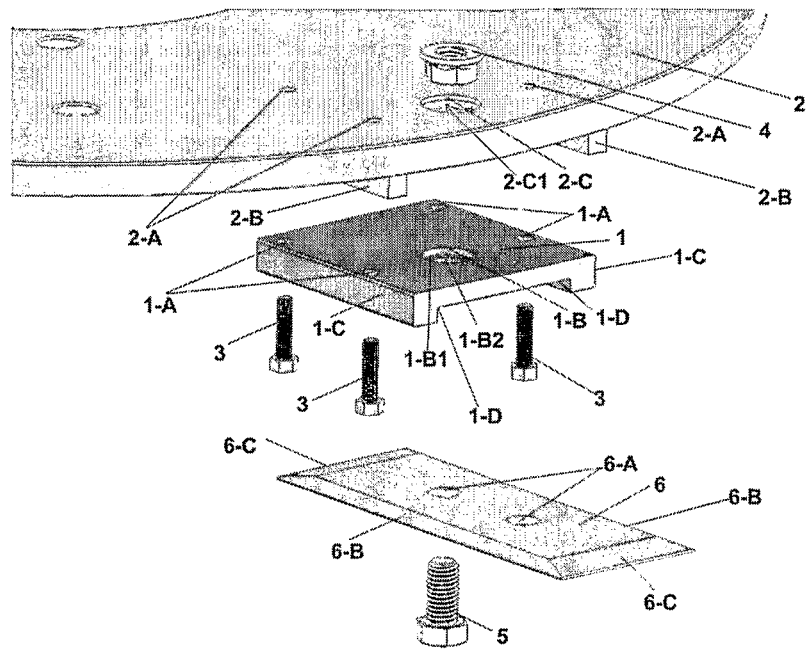
FIG. 3 shows the exploded perspective view of the disc, knife and counter knife and fixing components, related to the first embodiment.
Figure 4:
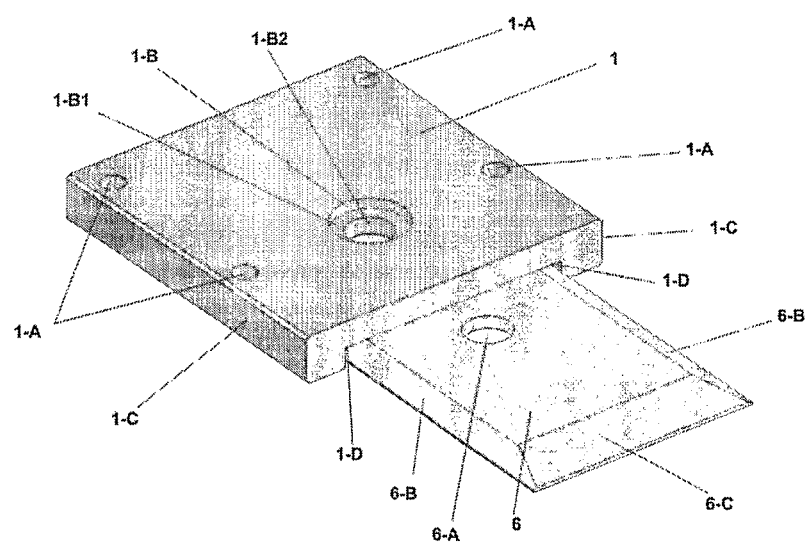
FIG. 4 shows the perspective view of the knife and counter knife, related to the first embodiment.

FIGS. 1 to 4 show the first embodiment of the knife and counter knife set containing a rectangular counter knife (1)

with four holes (1-A) formed symmetrically in the upper surface. Two holes (1-A) are positioned along one side of the counter knife (1) and the other two holes are positioned along the opposite side of the counter knife. The counter knife (1) includes a larger diameter hole (1-B) transversally centralized and longitudinally decentralized, that has a circular inner recess (1-B) forming a hole with smaller diameter (1-B2). The counter knife (1) further includes two lateral, longitudinal, parallel, rectangular and vertical walls (1-C) inferiorly forming a rectangular recess or cradle (1-D).

The counter knife (1) is fixed on rotating disc (2) through hex-head bolts (3) on by-pass holes (1-A) which are adjusted in four holes in the inferior-superior direction (2-A) on the disc surface (2), matching the four holes (1-A). The two rectangular, inferior and transversal guides (2-B) of the rotating disc (2) support the rectangular counter knife (1). A hex-nut sits (4) on the top of the disc (2) in a larger diameter hole (2-C) with a hexagonal inner shape (2-C1) on the rotating disc surface coincident to the hole (1-B). The hex-nut (4) receives a hex-head bolt (5) that initially passes through one of two holes (6-A) centrally provided along a rectangular knife (6). The knife (6) has two side cutting edges (6-B) and two cutting edges at the ends (6-C).

Figure 5:
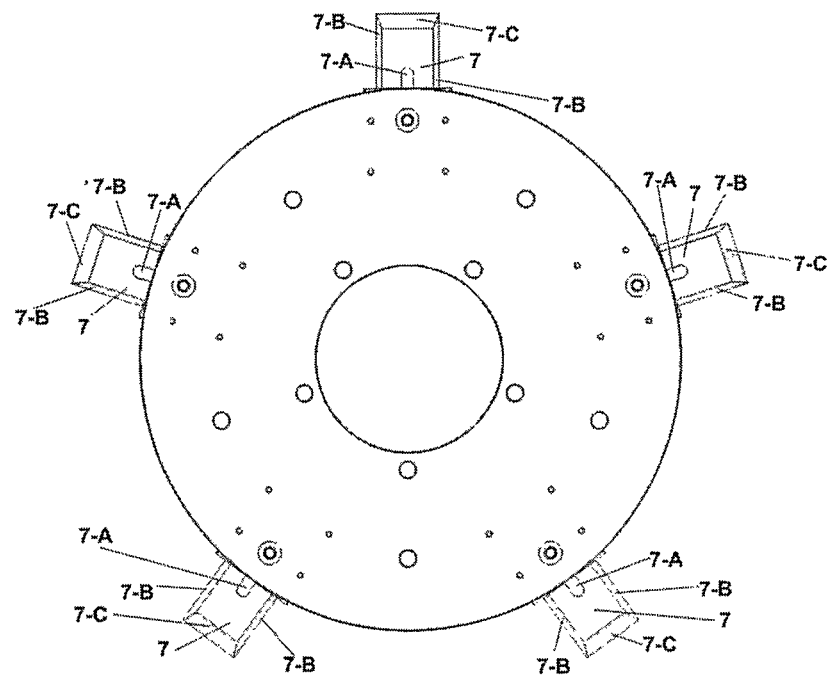
FIG. 5 shows the upper view of the second embodiment, showing the disc with the knife and counter knife.
Figure 6:
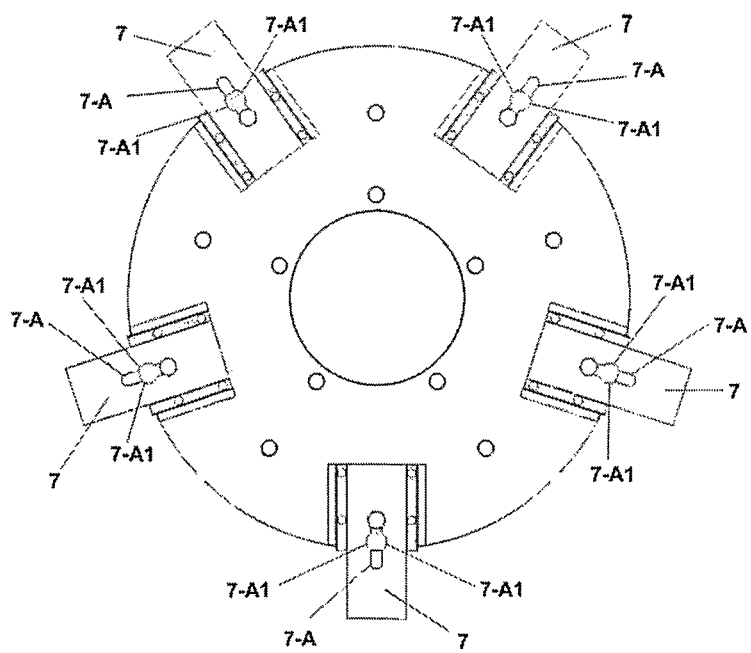
FIG. 6 shows the lower view of the second embodiment, showing the disc with the knife and counter knife.
Figure 7:
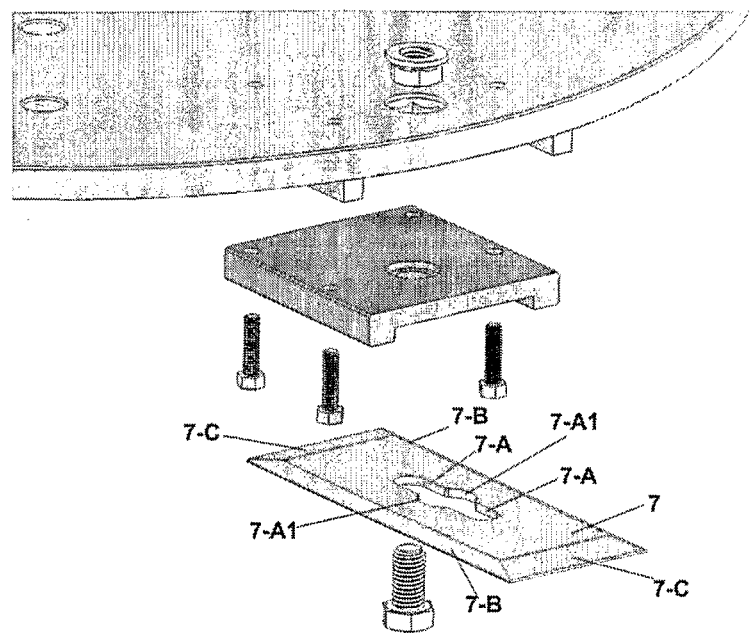
FIG. 7 shows the exploded perspective view of the disc, knife and counter knife and fixing components, related to the second embodiment.
Figure 8:
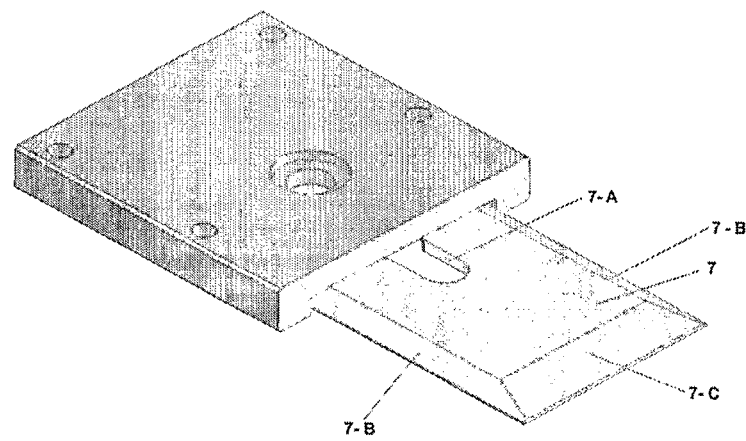
FIG. 8 shows in perspective the knife and counter knife, related to the second embodiment.

FIGS. 5 to 8 show a second embodiment of the knife and counter knife set, containing a rectangular knife (7) with a longitudinal, central and oblong opening (7-A). The opening (7-A) has two central, opposite and semi-circular projections (7-A1) that form a central circular opening in the middle of the knife. The knife (7) further has two side cutting edges (7-B) and two end cutting edges (7-C).

The invention claimed is:

1. A knife/counter knife assembly for a sugar cane harvesting machine comprising:
 a counter knife configured to attach to a rotating disc of the sugar cane harvesting machine between two transverse guides of the rotating disc, the counter knife comprising two longitudinal, parallel, vertical walls on opposite lateral edges of the counter knife, the walls defining a cavity therebetween, wherein each wall is a single continuous wall that runs the longitudinal length of the counter knife, and wherein the walls are configured to rigidly laterally support a knife within the cavity; and
 the knife comprising:
  a first cutting end and a second cutting end;
  a first cutting side and a second cutting side; and
  a first hole and a second hole, both the first hole and the second hole being located along the longitudinal axis of the knife and generally equidistant from the first cutting side and the second cutting side;
  wherein the first hole is located closer to the first cutting end than the second hole, and the second hole is located closer to the second cutting end than the first hole; and
 the knife is configured to attach to the counter knife using only a single bolt through one of the first hole and the second hole.

2. The knife of claim 1 wherein the counter knife is further configured to attach to the rotating disc using a plurality of bolts.

3. The knife of claim 1 wherein the rotating disc is configured to attach to a plurality of counter knives, each counter knife being further configured to attach to a respective knife.

4. The knife of claim 1 wherein the knife is further configured to attach to a rotating disc of the sugar cane harvesting machine using the bolt.

5. The knife of claim 1 wherein the knife is further configured such that:
 the first cutting end extends externally beyond the counter knife when the knife is attached to the counter knife by placing the bolt through the second hole; and
 the second cutting end extends externally beyond the counter knife when the knife is attached to the counter knife by placing the bolt through the first hole.

6. A knife/counter knife assembly for a sugar cane harvesting machine comprising:
 a counter knife configured to attach to a rotating disc of the sugar cane harvesting machine between two transverse guides of the rotating disc, the counter knife comprising two longitudinal, parallel, vertical walls on opposite lateral edges of the counter knife, the walls defining a cavity therebetween, wherein each wall is a single continuous wall that runs the length of the counter knife, and wherein the walls are configured to rigidly laterally support a knife within the cavity; and
 the knife comprising:
  a first cutting end and a second cutting end;
  a first cutting side and a second cutting side; and
  a longitudinally centrally located, oblong hole;
  wherein the knife is configured to attach to the counter knife using only a single bolt through the hole.

7. The knife of claim 6 wherein the hole is defined at least partially by two central, opposite and semi-circular projections forming a circular central opening in the knife.

8. The knife of claim 6 wherein the counter knife is further configured to attach to the rotating disc using a plurality of bolts.

9. The knife of claim 6 wherein the rotating disc is configured to attach to a plurality of counter knives, each counter knife being further configured to attach to a respective knife.

10. The knife of claim 6 wherein the knife is further configured such that the first cutting end of the knife extends outward from the rotating disc when the knife is attached to the counter knife.

11. The knife of claim 6 wherein the knife is further configured to detach from the counter knife if the bolt is only partially loosened.

12. The knife of claim 6 wherein the knife is further configured to attach to a rotating disc of the sugar cane harvesting machine using the bolt.

* * * * *